(12) United States Patent
Mishra et al.

(10) Patent No.: US 11,708,465 B1
(45) Date of Patent: Jul. 25, 2023

(54) DURABLE LATEX POLYMER DISPERSION

(71) Applicant: BEHR PROCESS CORPORATION, Santa Ana, CA (US)

(72) Inventors: Deepak Mishra, Pune (IN); Sreya Nandi, West Bengal (IN); Sarath Chandran, Kerala (IN); Niranjan Goriwale, Pune (IN); Hemant Nair, Pune (IN); Frank Olechnowicz, La Mirada, CA (US); Ruben Aguilar, Anaheim, CA (US); Jigui Li, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 168 days.

(21) Appl. No.: 17/200,521

(22) Filed: Mar. 12, 2021

(51) Int. Cl.
*C08F 220/12* (2006.01)
*C08J 3/215* (2006.01)

(52) U.S. Cl.
CPC .......... *C08J 3/215* (2013.01); *C08F 220/12* (2013.01); *C08J 2433/08* (2013.01)

(58) Field of Classification Search
CPC .. C08F 2/24; C08F 20/18; C08F 20/14; C08F 20/06; C09D 5/024; C09D 5/002; C09D 5/022
See application file for complete search history.

(56) References Cited

FOREIGN PATENT DOCUMENTS

WO    WO-2016015192 A1 *  2/2016 ................ C08F 2/24

* cited by examiner

*Primary Examiner* — Robert D Harlan
(74) *Attorney, Agent, or Firm* — Brooks Kushman P.C.

(57) ABSTRACT

A method for forming a durable latex polymer emulsion includes a step of forming a pre-emulsion by combining a monomer composition with a reactive emulsifier, a reactive silane compound, an epoxy crosslinker, and a phosphate-containing monomer in water. The pre-emulsion is polymerized by combining the pre-emulsion with a radical initiator to form a reaction mixture that polymerizes to form a hydride silicon-acrylic emulsion polymer.

12 Claims, 3 Drawing Sheets

DURABLE LATEX POLYMER DISPERSION

TECHNICAL FIELD

In at least one aspect, a durable latex polymer dispersion having improved dirt and mar resistance is provided.

BACKGROUND

Any discussion of the prior art throughout the specification should in no way be considered as an admission that such prior art is widely known or forms part of common general knowledge in the field.

Synthetic acrylic and modified acrylic water-based polymers are used in protective coatings for exterior application such as outside walls of buildings, floors, and decks, and also for aesthetic looks on several substrates. When acrylic water-based systems are used, it is difficult to get all the properties and performance comparable to a solvent based systems. Efforts have been made to make an improved silicon-modified acrylic water-based resin which can satisfy most of the requirement.

Ambient crosslinking systems are used for enhancing properties, achieved through full curing that does not require elevated temperature. Internal crosslinking, pH, surfactants, functionalities for post crosslinking and molecular weight are some of the parameters which greatly affects final performance of the coatings. These synthetic resins are used use for different coating applications such as primer, topcoat, sealer, tinted, non-tinted and in combination with other resin for improvement in certain desired properties. One or multiple coats may be required for reaching best performance.

Some formulations can be produced with special or regular additives in combination with these resins to further improve the coating performance, provided enough functionalities are provided and are available. These improvements include hardness, hydrophobicity, chemical resistance, adhesion on multiple substrates, gloss & gloss retention, weatherability and dirt pickup resistance to name some. Exterior environments also require that the film dries and cures at low temperature during the winter season.

The disadvantages of many exterior coatings are that they may not give all the important performance. As the hardness increases, coatings typically become brittle and lose adhesion from both flexible and inflexible substrates. Strong durability is desired in exterior coatings, where conditions range from mild, household cleaners to severe conditions such as tires in a garage.

Accordingly, there is a need for improved latexes that form coatings with resistance to water, improved hardness to resist dirt and tires, while maintaining adhesion on inorganic surfaces.

SUMMARY

In at least one aspect, a method for forming a silicon-acrylic polymer emulsion is provided. The method includes a step of forming a pre-emulsion by combining a monomer composition with a reactive emulsifier, reactive silane, epoxy crosslinker, and phosphate adhesion promoter in water, the monomer composition including one or more monomers selected from the group consisting of (meth)acrylic acid monomers and (meth)acrylic monomers, and combinations thereof. The pre-emulsion is polymerized by combining the pre-emulsion with a radical initiator in a reactor to form a reaction mixture that polymerizes to form an emulsion polymer. Advantageously, these silicon-acrylic polymer emulsions can be used to form coatings with improved resistance to water and other chemicals, improved hardness to resist dirt and tires, and strong and enduring adhesion on inorganic surfaces.

In another aspect, a method for forming a durable latex polymer emulsion is provided. The method includes a step of forming a pre-emulsion by combining a monomer composition with a reactive emulsifier, a reactive silane compound, an epoxy crosslinker, and a phosphate-containing monomer in water. The pre-emulsion is polymerized by combining the pre-emulsion with a radical initiator to form a reaction mixture that polymerizes to form a hydride silicon-acrylic emulsion polymer.

In another aspect, a method for forming a durable latex polymer emulsion is provided. The method includes a step of forming a first monomer pre-emulsion by combining components of a first reactive mixture. The first reactive mixture includes a first monomer composition, a reactive emulsifier, and water. The method also includes a step of forming a second monomer pre-emulsion by combining components of a second reactive mixture, the second reactive mixture including a second monomer composition, acetoacetoxyethyl methacrylate, and water. The first monomer pre-emulsion is polymerized by combining an initiator-catalyst composition with the first monomer pre-emulsion in a reaction vessel over a first time period at a first reaction temperature. The second monomer pre-emulsion is polymerized by adding the second monomer pre-emulsion to the reaction vessel over a second time period at a second reaction temperature.

Advantageously, the polymer emulsions provided herein improve durability and property maintenance. Durability and property maintenance are key for any interior and exterior, clear or pigmented floor coating. The polymer emulsions have greatly improved the 1) resistance to water whitening, 2) durability against dirt and tires and other traffic damage, 3) and inorganic adhesion on paving materials or painted surfaces. The polymer emulsions can extend the functional lifetime through increased resistance to damage, while maintaining the beauty and decoration of the coatings. These benefits are achieved through a synergistic effect of multiple design elements, and in particular, the monomers acetoacetoxyethyl methacrylate, the reactive silane, the epoxy crosslinker, and phosphate ester of glycol monomethacrylate (can cross-link the polymer chains to increase the toughness of the coating while also improving the inorganic adhesion). The use of reactive surfactant gives improved resistance against water whitening of the coating.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
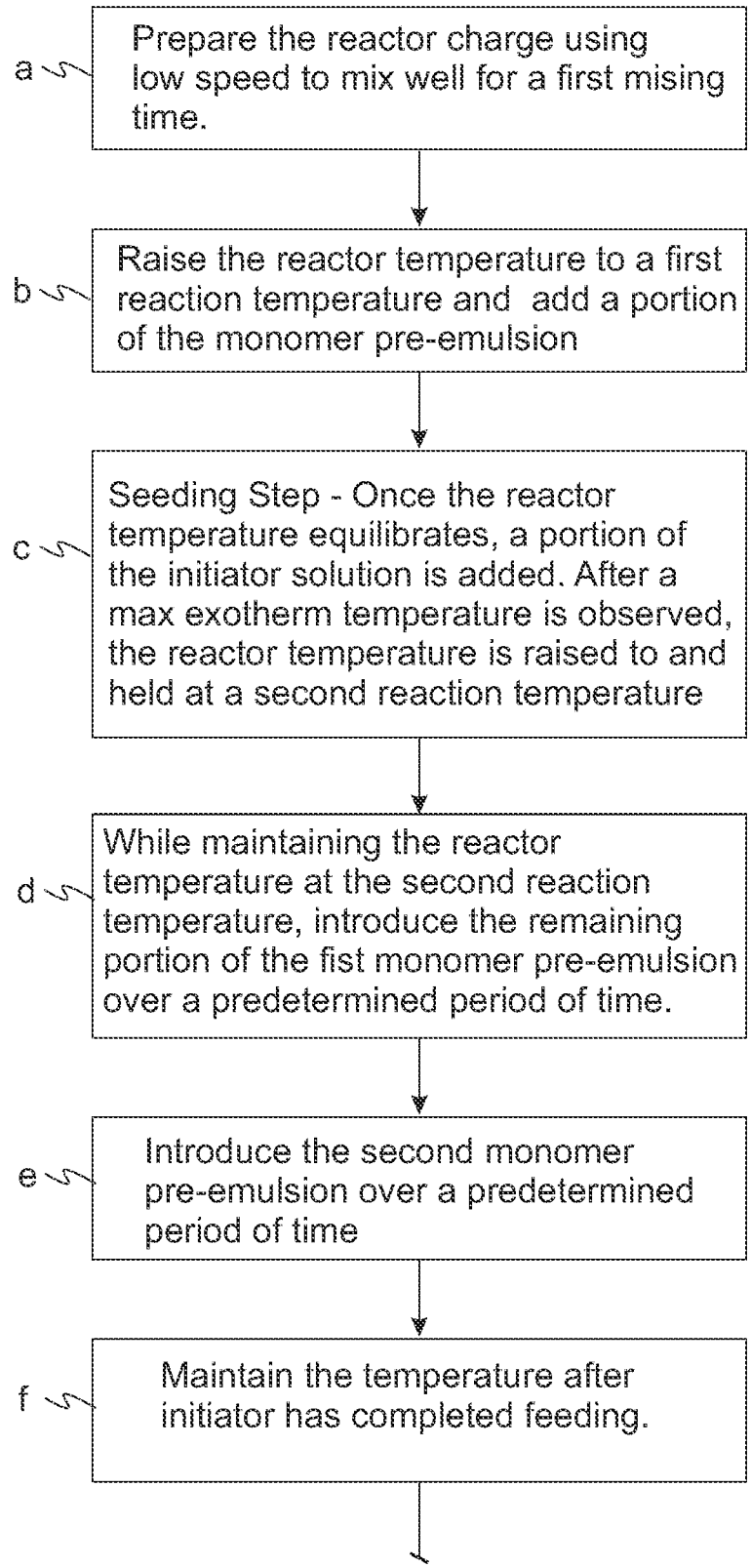
FIGS. 1A and 1B. Flow chart illustrating the preparation of a durable polymer emulsion.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and $L^-$ is a negatively charged counter ion; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R''')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and $L^-$ is a negatively charged counter ion; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "one or more" means "at least one" and the term "at least one" means "one or more." The terms "one or more" and "at least one" include "plurality" and "multiple" as a subset. In a refinement, "one or more" includes "two or more."

Throughout this application, where publications are referenced, the disclosures of these publications in their entireties are hereby incorporated by reference into this application to more fully describe the state of the art to which this invention pertains.

The term "ambient temperature" refers to the surrounding environmental temperature typically in the range of 4° C. to 37° C.

The term "alkylenyl" means a divalent saturated hydrocarbon group which may be linear or branched or combinations thereof. Typically, such alkylenyl groups contain from 1 to 10 carbon atoms.

The term "emulsion polymer" means a dispersion or emulsion of polymer particles in water containing one or more secondary dispersing or emulsifying agents (e.g., a surfactant, alkali-soluble polymer or mixtures thereof) whose presence is required to form the dispersion or emulsion.

The term "(meth)acrylate" means an acrylate and/or a methacrylate.

The term "alkyl (meth)acrylate" means an alkyl acrylate and/or an alkyl methacrylate. For example, "butyl (meth) acrylate" refers to butyl acrylate and/or butyl methacrylate.

Abbreviations:
"AAEM" means acetoacetoxyethyl methacrylate.
"APS" means ammonium persulfate.
"GMA" means glycidyl methacrylate
"BA" means butyl acrylate.
"MAA" means methacrylic acid.
"MMA" means methyl methacrylate.

In an embodiment, a method for a durable latex polymer emulsion is provided. The method includes a step of forming a pre-emulsion by combining a monomer composition with a reactive emulsifier, a reactive silane compound, an epoxy crosslinker, and a phosphate-containing monomer in water. The pre-emulsion is polymerized by combining the pre-emulsion with a radical initiator to form a reaction mixture that polymerizes to form the durable latex polymer emulsion. Therefore, the present method involves free radical polymerization. Typically, the durable latex polymer emulsion is a hydride silicon-acrylic emulsion polymer. In a refinement, a modified acrylic water-based polymer composition is formed. Advantageously, the epoxy crosslinker provides post and ambient crosslinking of the durable latex polymer emulsion.

In a variation, the reactive emulsifier includes a polymerizable surfactant. A suitable polymerizable surfactant is an anionic ether sulfate surfactants such as Reasoap SR 1025 commercially available from Adeka Corporation. Typically, the epoxy crosslinker is a glycidyl (meth)acrylate such as glycidyl methacrylate.

Typically, the monomer composition includes one or more monomers selected from the group consisting of (meth)acrylic acid monomers, (meth)acrylic monomers, vinyl acetate, aromatic monomers, vinyl neodecanoate, and combinations thereof. In a refinement, the monomer composition includes acetoacetoxyethyl methacrylate. In a further refinement, the monomer composition includes one or more $C_{1-10}$ alkyl (meth)acrylates acrylates. In a further refinement, the monomer composition includes one or more $C_{2-10}$ alkyl (meth)acrylates acrylates. Examples of the one or more $C_{1-10}$ alkyl (meth)acrylates include an acrylate selected from the group consisting of methyl acrylate, ethyl acrylate, propyl acrylate, butyl acrylate, hexyl acrylate, octyl acrylate, 2-ethylhexyl acrylate, and combinations thereof. In particular, the monomer composition includes a component selected from the group consisting of methyl acrylate, butyl acrylate and combinations thereof.

In a variation, the reactive silane compound have formula 1:

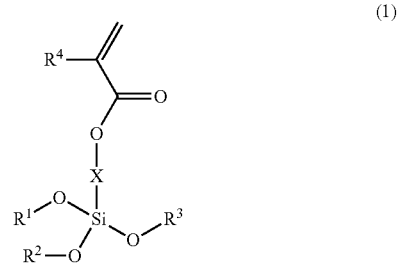

(1)

where:
X is a $C_{1-10}$ alkylenyl;
$R^1$, $R^2$, $R^3$ are each independently $C_{1-10}$ alkyl; and
$R^4$ is H or $C_{1-10}$ alkyl.

In another variation, the phosphate-containing monomer is a phosphate ester of a (meth)acrylate. In a refinement, the phosphate-containing monomer is a phosphate ester of polypropylene glycol monomethacrylate. In some aspects, the phosphate-containing monomer is a phosphate adhesion promoter.

In another embodiment, a method for forming a durable latex polymer emulsion by a two stage process is provided. The method includes a step of forming a first monomer pre-emulsion by combining components of a first reactive mixture. The first reactive mixture includes a first monomer composition, a reactive emulsifier, and water. The method also includes a step of forming a second monomer pre-emulsion by combining components of a second reactive mixture, the second reactive mixture including a second monomer composition, acetoacetoxyethyl methacrylate, and water. The first monomer pre-emulsion is polymerized by combining an initiator-catalyst composition with the first monomer pre-emulsion in a reaction vessel over a first time period at a first reaction temperature. The second monomer pre-emulsion is polymerized by adding the second monomer pre-emulsion to the reaction vessel over a second time period at a second reaction temperature.

In a variation, the first reactive mixture further includes a reactive component selected from the group consisting of a reactive silane, an epoxy crosslinker, and combinations thereof. In another variation, the second reactive mixture further includes a reactive component selected from the group consisting of a reactive silane, an epoxy crosslinker, a phosphate-containing monomer, and combinations thereof. Details of the reactive silane, an epoxy crosslinker, and the phosphate-containing monomer are the same as set forth above.

In another aspect, a first polymerization product from the first monomer pre-emulsion is a hard polymer core of the durable latex polymer emulsion. In another aspect, a second polymerization product of the second monomer pre-emulsion a continuous polymer film that acts as a shell for surrounding the hard polymer core.

In a variation, the method further includes comprising adding at least one chaser to the reaction vessel after the second monomer pre-emulsion.

In some variations, the first monomer composition and the second monomer composition each independently include one or more monomers selected from the group consisting of (meth)acrylic acid monomers, (meth)acrylic monomers, vinyl acetate, aromatic monomers, vinyl neodecanoate, and combinations thereof. In a refinement, the first monomer composition and the second monomer composition each independently include acetoacetoxyethyl methacrylate. In another refinement, the first monomer composition and the second monomer composition each independently include one or more $C_{1-10}$ alkyl (meth)acrylates. In a further refinement, the one or more $C_{1-10}$ alkyl (meth)acrylates include an acrylate selected from the group consisting of methyl acrylate, ethyl acrylate, propyl acrylate, butyl acrylate, hexyl acrylate, octyl acrylate, 2-ethylhexyl acrylate, and combinations thereof.

In a variation, the method for forming a durable latex polymer emulsion by a two stage process includes a step of forming a first monomer pre-emulsion by combining acetoacetoxyethyl methacrylate, methacryloxypropyl trimethoxysilane, glycidyl methacrylate, and water. In a refinement, the first monomer pre-emulsion is formed by combining acetoacetoxyethyl methacrylate, methacryloxypropyl trimethoxysilane, glycidyl methacrylate, methacrylic acid and a first alkyl (meth)acrylate, and water. In a further refinement, the first monomer pre-emulsion further includes a component selected from the group consisting of a base (e.g., sodium carbonate), emulsifier, and combinations thereof.

In a variation, the weight ratio of the acetoacetoxyethyl methacrylate to the glycidyl methacrylate in the first monomer pre-emulsion is 1.5:1 to 4:1 and the the weight ratio of the methacryloxypropyl trimethoxysilane to the glycidyl methacrylate is from 0.1:1 to 0.5:1. In a refinement, the weight ratio of the acetoacetoxyethyl methacrylate to the glycidyl methacrylate in the first monomer pre-emulsion is at least, in increasing order of preference, 1:1, 1.5:1, 2:1, 2.2:1, or 2.5:1 and at most 5:1, 4:1, 3.5:1, 3.3:1; or 3:1. In a further refinement, the weight ratio in the first monomer pre-emulsion of the methacryloxypropyl trimethoxysilane to the glycidyl methacrylate is at least, in increasing order of preference, 0.1:1, 0.13:1, 0.15:1, 0.18, or 0.19:1 and at most, in increasing order of preference, 0.4:1, 0.3:1, 0.25:1, 0.23:1, or 0.21:1.

In a variation, the step of forming a second monomer pre-emulsion includes combining acetoacetoxyethyl methacrylate, methacryloxypropyl trimethoxysilane, phosphate ester based adhesion promotor (i.e., the adhesion promoter includes a phosphate ester), and water. In a refinement, the first monomer pre-emulsion is formed by combining acetoacetoxyethyl methacrylate, methacryloxypropyl trimethoxysilane, phosphate ester based adhesion promotor (i.e., the adhesion promoter includes a phosphate ester), methacrylic acid and a second alkyl (meth)acrylate, and water. In a further refinement, the second monomer pre-emulsion further includes a component selected from the group consisting of a base (e.g., sodium carbonate), emulsifier, and combinations thereof.

In a variation, the weight ratio of the acetoacetoxyethyl methacrylate to methacryloxypropyl trimethoxysilane in the second monomer pre-emulsion is from 2:1 to 5:1 and the weight ratio in the second monomer pre-emulsion of the methacryloxypropyl trimethoxysilane to the phosphate ester based adhesion promotor is from 0.5:1 to 2:1. In a refinement, the weight ratio of the acetoacetoxyethyl methacrylate to methacryloxypropyl trimethoxysilane in the second monomer pre-emulsion is at least in increasing order of preference 1.5:1, 2:1, 2.5:1, 3:1, or 3.2:1 and at most, in increasing order of preference, 6:1, 5:1, 4.5:1, 4:1, or 3.8:1. In a further refinement, the weight ratio of the methacryloxypropyl trimethoxysilane to the phosphate ester based adhesion promotor in the second monomer pre-emulsion is at least, in increasing order of preference, 0.3:1, 0.5:1, 0.7:1, 0.9:1, to 1:1.

An initiator-catalyst composition ("the initiator solution") is then combined with the first monomer pre-emulsion over a first time period at a first reaction temperature to form a reaction composition. The second monomer pre-emulsion is then added to the reaction composition over a second time period at a second reaction temperature. Polymerization of the reaction composition is then allowed to proceed for a third time period. At least one chaser is added to the reaction vessel.

The method further includes a step of polymerizing the first monomer pre-emulsion by combining an initiator-catalyst composition with the first monomer pre-emulsion in a reaction vessel over a first time period at a first reaction temperature. In a refinement, the first reaction temperature is from about 70 to 90° C. The polymerization product from the first monomer pre-emulsion is a hard core of the latex polymer emulsion which can assist in improving dirt pick-up resistance.

The method also includes a step of polymerizing the second monomer pre-emulsion by adding the second monomer pre-emulsion to the reaction vessel over a second time period at a second reaction temperature. In a refinement, the second reaction temperature is from about 70 to 90° C. The polymerization product of the second monomer pre-emulsion is advantageously a continuous polymer film that acts as a shell for the latex polymer emulsion.

Figure 1B:
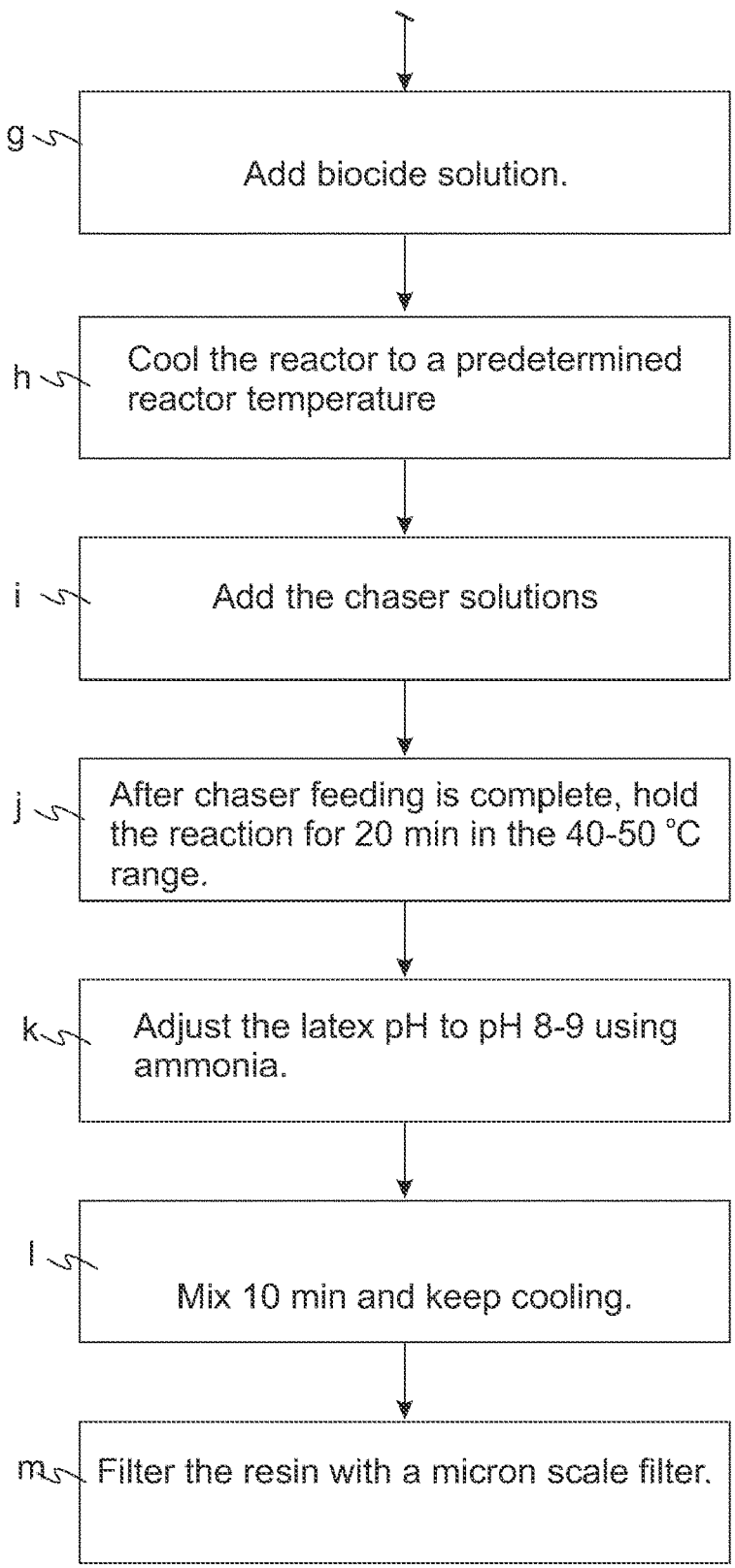
Figure 1C:
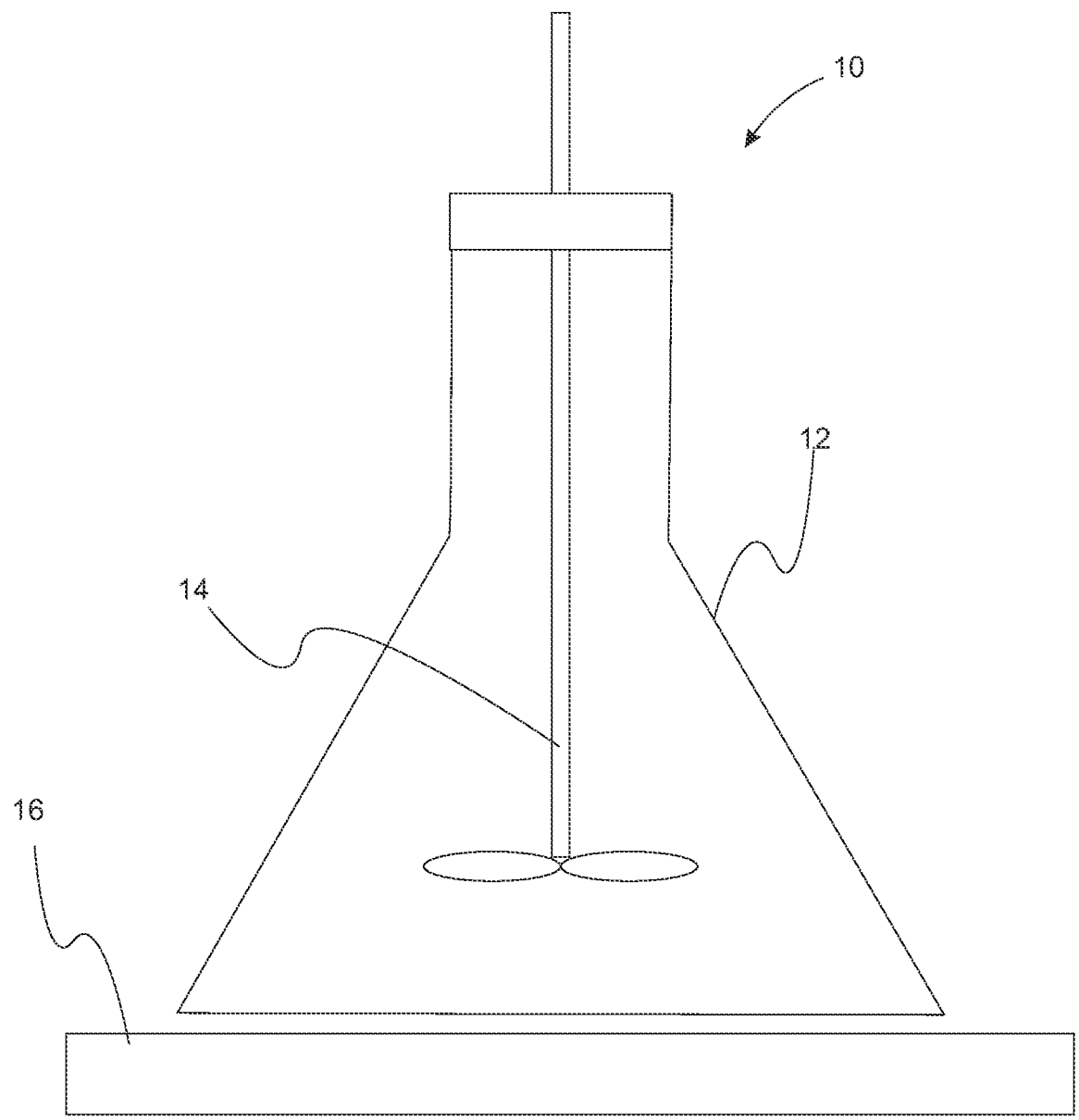
FIG. 1C. Schematic of an apparatus for preparing a durable polymer emulsion.

FIGS. 1A and 1B provide a flow chart depicting an example of the method for preparing a durable latex polymer dispersion. FIG. 1C provides a schematic of a reactor for carrying out the method. Reactor 10 includes a reactor vessel 12, a stirrer 14, and a temperature control system 16 for heating and cooling. In step a), a reactor charge solution is introduced into reactor vessel 12. After introduction into the vessel, stirrer 14 is used to mix the solution for a first predetermined mixing time period. An example of a reactor charge solution includes a base (e.g., sodium carbonate), emulsifier, and water. In a refinement, the reactor charge solution includes the base in an amount of about 0.05 to 0.5 weight percent of the total weight of the reactor charge solution, emulsifier in an amount of about 2 to 8 weight percent of the total weight of the reactor charge solution, and water in an amount to provide the balance of the reactor charge solution. In step b), the temperature of reactor vessel 10 is raised to a first reaction temperature and a portion of the monomer pre-emulsion added. In a refinement, about 2 to 8 weight percent of the monomer pre-emulsion is added in this step. In a further refinement, the first reaction temperature is from about 70 to 90° C. In step c), a seeding step is commenced once the reactor temperature equilibrates at the first reaction temperature. In this step, a portion of an initiator solution is added to the reactor vessel 10. At this point, an exotherm in which the reaction temperature increases is typically observed. Moreover, a color change is also typically observed during the seeding step. The reactor temperature is then increased to a second reaction temperature and held at that temperature for a sufficient time for the seeding step to complete. In step d), while maintaining the reactor temperature at the second reaction temperature, the remaining portion of the fist monomer pre-emulsion is introduced into reactor vessel 10 over a first predetermined addition time period. In a refinement, this period of time is about 50 minutes to about 100 minutes.

In step e), the second monomer pre-emulsion is introduced into the reaction vessel over a second predetermined addition time period. In a refinement, this period of time is from about 100 minutes to about 300 minutes. In this regard, it should be appreciated that the initiator solution is continuously introduced into the reactor vessel during steps d) and e) and optionally after and/or before steps d) and e) over a third predetermined addition time period. (e.g., 100 to 300 minutes). In step f), the reaction temperature is maintained after initiator has completed feeding for a predetermined period of time (e.g., 10 to 60 minutes) to allow the polymerization to proceed. In step g), a biocide is added. In step h), the reactor is cooled to a first predetermined cooled reactor temperature (e.g., 35 to 55° C.). In step i), the chaser solutions are added to reactor vessel 12. In a refinement, a first chaser solution and a second chaser solution are added. In a further refinement, the first chaser solution and second chaser solution are simultaneously added but spatially separated during this addition. In step j), after chaser feeding is complete, the reaction is held for 20 min in the 35-55° C. range. In step k), the pH of the thus formed latex is adjusted to a pH from 7 to 10 (e.g., using ammonia). In step l), the latex is mixed for an additional mixing time period (e.g., 5 to 20 minutes) while cooling is continued. In step m), the latex is filtered with a micron scale filter (e.g., 100 to 200 micron filter).

In another embodiment, an emulsion polymer is provided. The emulsion polymer includes a first reaction product of a first monomer pre-emulsion. The first monomer includes acetoacetoxyethyl methacrylate, methacryloxypropyl trimethoxysilane, glycidyl methacrylate, and water. Characteristically, the first reaction product includes a hard polymer core. The emulsion polymer also includes a second reaction product of a second monomer pre-emulsion including acetoacetoxyethyl methacrylate, methacryloxypropyl trimethoxysilane, a phosphate ester based adhesion promotor, and water. Advantageously, the second reaction product is a continuous polymer film that acts as a shell for surrounding the hard polymer core.

As set forth above, the first monomer pre-emulsion and the second monomer pre-emulsion of the emulsion polymer each independently further include methacrylic acid, methyl methacrylate, and a $C_{2-10}$ alkyl (meth)acrylate. In a refinement, the $C_{2-10}$ alkyl (meth)acrylate is ethyl acrylate, propyl acrylate, butyl acrylate, hexyl acrylate, octyl acrylate, or 2-ethylhexyl acrylate. In a further refinement, the $C_{2-10}$ alkyl (meth)acrylate is butyl acrylate. Also as describe above, the weight ratio of the acetoacetoxyethyl methacrylate to the glycidyl methacrylate in the first monomer pre-emulsion is 1.5:1 to 4:1 and the weight ratio of the methacryloxypropyl trimethoxysilane to the glycidyl methacrylate in the first monomer pre-emulsion is from 0.1:1 to 0.5:1. In a refinement, the weight ratio of the acetoacetoxyethyl methacrylate to methacryloxypropyl trimethoxysilane in the second monomer pre-emulsion is from 2:1 to 5:1 and the weight ratio in the second monomer pre-emulsion of the methacryloxypropyl trimethoxysilane to the phosphate ester based adhesion promotor is from 0.5:1 to 2:1.

Examples of the alkyl acrylate contained in the core include methyl acrylate, ethyl acrylate, propyl acrylate, butyl acrylate, hexyl acrylate, octyl acrylate, 2-ethylhexyl acrylate and the like. Specifically, the alkyl acrylate may be n-butyl acrylate, 2-ethylhexyl acrylate or the like.

In a variation, the paint composition set forth above is made by a two-step process—the mill and the letdown. In the mill step, the solvent (water), dispersant, defoamer, and pigments are mixed together with large shear forces. In the letdown step, the silicon-acrylic resin, the mildewcide, if present, the rheology modifier, if present, and the biocide, if present, are added to the grind product.

The following examples illustrate the various embodiments of the present invention. Those skilled in the art will recognize many variations that are within the spirit of the present invention and scope of the claims.

Table 1 provides an example of a total resin composition. The latex recipe was based on 1000 parts of total monomer. All ingredients can be resized proportionally according to its ingredient ratios. Moreover, the invention can be practiced in a range plus or minus, in increasing order of preference, 30%, 20%, 10% percent, 5 percent, or 2 percent of the values indicated in Table 1.

TABLE 1

Total resin composition, normalized to 1000 parts of monomer

| Monomers | Parts per 1000 of Total Monomer by weight |
|---|---|
| Butyl Acrylate (BA) | 419.6 |
| Methyl Methacrylate (MMA) | 470.6 |
| Methacrylic Acid (MAA) | 52.4 |
| Acetoacetoxyethyl Methacrylate (AAEM) | 37.9 |
| Methacryloxypropyl Trimethoxysilane (Andisil 174) | 8.9 |
| Glycidyl Methacrylate (GMA) | 3.1 |
| Phosphate ester based adhesion promotor, PAM 600 | 7.6 |
| Emulsifier or Surfactants (w/w) | |
| Reasoap SR 1025 | 60.2 |
| Rhodafac RS-610/A25 | 38.4 |
| Other Compounds (w/w) | |
| Sodium Carbonate | 3.7 |
| n-Dodecane Thiol | 0.37 |
| Ammonium Persulfate (APS) | 2.7 |
| tert-Butyl hydroperoxide (70% in water) | 1.9 |

TABLE 1-continued

Total resin composition, normalized to 1000 parts of monomer

| Monomers | Parts per 1000 of Total Monomer by weight |
|---|---|
| Bruggolite FF6M | 1.6 |
| Ammonia 26 BE | 24.3 |
| Acticide CBM 2 | 6.1 |

TABLE 2

Material Benefits and Sources

| | |
|---|---|
| BA, MMA, and MAA monomers | Commodity monomers used to adjust the latex polymer hardness. MAA has synergistic effect with GMA to cross-link polymer chains and improve hardness, dirt pick up and hot tire pick up resistances, and adhesion onto inorganic substrates. |
| Acetoacetoxy ethyl Methacrylate (AAEM) | Available from Eastman. AAEM has self-crosslinking or cross-linking with amines and other additives for improved hardness, dirt pickup and hot tire pick up resistances, and adhesion onto inorganic substrates. |
| Methacryloxypropyl Trimethoxysilane | Available from AB Specialty Silicones (Andisil 174) and Wacker (Geniosil GF 31). Alkoxy-silane will get hydrolyzed to create silanol groups, which can cross-link polymer chains to improve hardness properties, as well as improve resistance to water whitening and improve adhesion onto inorganic substrates through direct, covalent bonding to the surface. |
| Glycidyl Methacrylate (GMA) | A specialty monomer available from Sigma Aldrich. Epoxy group can cross-link with MAA and Andisil 174 to increase the coating toughness and improve inorganic adhesion through direct, covalent bonding to the surface. |
| Phosphate Ester of Polypropyelene Glycol Monomethacrylate (PAM 600): | Available from Solvay. Phosphate ester group can covalently bond to inorganic surfaces to improve inorganic adhesion. |
| Reasoap SR 1025: | Available from Adeka. SR 1025 is as a reactive surfactant that gets incorporated into the polymer, thus avoiding surfactant leeching and improving resistance against water whitening. |
| Rhodafac RS-610/A25 | A Solvay emulsifier providing latex stability. |
| Sodium Carbonate | A basic salt available from Sigma Aldrich. Sodium Carbonate is used to control the pH during the polymerization. |
| n-Dodecane Thiol | A chemical available from Sigma Aldrich, n-Dodecane Thiol is used to control particle size, thereby improving resistance against water whitening. |
| Ammonium Persulfate (APS) | A salt available from Sigma Aldrich. APS is used as a radical initiator to control the polymerization |
| tert-Butyl hydroperoxide (70% in water) | A chemical available from Sigma Aldrich. tBHP is used in conjunction with FF6M to reduce monomer residues and reduce VOCs. |
| Bruggolite FF6M | Available from Brüggemann. FF6M is used in conjunction with tBHP to reduce monomer residues and reduce VOCs. |
| Ammonia 26 BE | Commodity chemical available from KMG. Ammonia is used to control the final pH and to extend the functional lifetime of the AAEM specialty monomer. |
| Acticide CBM 2 | Available from Thor Specialties. CBM 2 is a biocide, used to reduce microbial growth and extend the in-can lifetime of the resin. |

Example Latex 1

Table 3 provides the compositions for a basic latex formula without key specialty components.

TABLE 3

Chemical Compositions of Latex 1

| | Mass (g) |
|---|---|
| Reactor Charge | |
| Water | 550 |
| Sodium Carbonate | 2 |
| Rhodacal A246 (40% solids) | 38 |
| Stage 1 | |
| Water | 150 |
| Sodium Carbonate | 0.2 |
| Rhodacal A246 (40% solids) | 15.6 |
| BA | 27.3 |
| MMA | 275.6 |
| MAA | 12.2 |
| Stage 2 | |
| Water | 350 |
| Sodium Carbonate | 0.6 |
| Rhodacal A246 (40% solids) | 21.9 |
| BA | 419.3 |
| MMA | 245 |
| MAA | 20.2 |
| Chain Transfer Agent | 1 |
| Initiator | |
| Water | 60 |
| Ammonium Persulfate | 3 |
| Chaser 1 | |
| Water | 60 |
| Bruggolite FF6M | 2 |
| Chaser 2 | |
| Water | 60 |
| t-Butyl Hydrogen Peroxide (70%) | 2 |
| Neutralizer | |
| Ammonia solution (17%) | 20 |
| Biocide | |
| Acticide MBS 2550 | 4 |

This latex is formed as follows: Add all components of reactor charge to a sealed reactor kettle flushed with nitrogen and make them mix well. To prepare first pre-emulsion, mix water, sodium carbonate, and surfactant at 150 rpm for 10 minutes until everything is dissolved and homogenous. Turn the mixer speed up to 500 rpm and add the remaining pre-emulsion components. Once all components have been added, stir pre-emulsion for 30 minutes to ensure stable emulsification. Prepare initiator by dissolving persulfate in water, and load into syringe pump connected to reactor. Heat reactor charge to 80° C. while stirring and then feed in 5% pre-emulsion. Wait for the kettle to reach 80° C. again and then add 5% initiator solution to obtain latex seeds. Allow reactor to exotherm, and fully react ~15 minutes or until the temperature stabilizes after the exotherm. Increase temperature to 85° C. Feed first pre-emulsion at a steady rate over 1 hour while simultaneously feeding in initiator over 4.5 hours. To prepare second pre-emulsion, mix water, sodium carbonate, and surfactant at 150 rpm for 10 minutes until everything is dissolved and homogenous. Turn the mixer speed up to 500 rpm and add the remaining pre-emulsion components. Once all components have been added, stir pre-emulsion for 30 minutes to ensure stable emulsification. After the first monomer pre-emulsion feed was finished, feed the second pre-emulsion at a steady rate over 3 hours.

After feeding, hold the reactor at temperature for 30 minutes and then cool reactor to 45-55° C. Dissolve chaser feeds separately into water and load into separate syringes. Add syringes to a syringe pump connected to the reactor. Feed chaser solutions simultaneously into the reactor for 20 minutes at 45-55° C. Hold reaction at temperature for 20 minutes after the chaser solution feeding. Cool to room temperature and add neutralizer and biocide. Filter the latex, using a 150 micron filter, into a container for storage.

Example Latexes 2 and 3

Table 4 provides the compositions for latex formulas with key specialty components but only conventional surfactants or with only a single stage.

TABLE 4

Chemical Compositions of Latexes 2 and 3

| | Latex 2 Mass (g) | Latex 3 Mass (g) |
|---|---|---|
| Reactor Charge | | |
| Water | 550 | 550 |
| Sodium Carbonate | 2 | 2 |
| Rhodacal A246 (40% solids) | 38 | 38 |
| Stage 1 | | |
| Water | 150 | 500 |
| Sodium Carbonate | 0.2 | 0.8 |
| Rhodacal A246 (40% solids) | 15.6 | |
| Reactive Emulsifier (25% Solids) | | 60 |
| BA | 27.3 | 411.4 |
| MMA | 257 | 470.4 |
| MAA | 12.2 | 52.4 |
| AAEM | 10 | 40 |
| Reactive silane | 3 | 12 |
| Epoxy crosslinker | 5 | 5 |
| Phosphate Adhesion Promoter | — | 9 |
| Chain Transfer Agent | — | 1 |
| Stage 2 | | |
| Water | 350 | |
| Sodium Carbonate | 0.6 | |
| Rhodacal A246 (40% solids) | 21.9 | |
| BA | 383.9 | |
| MMA | 227.5 | |
| MAA | 25.2 | |
| AAEM | 30 | |
| Reactive Silane | 10 | |
| Phosphate Adhesion Promoter | 9 | |
| Chain Transfer Agent | 1 | |
| Initiator | | |
| Water | 60 | 60 |
| Ammonium Persulfate | 3 | 3 |
| Chaser 1 | | |
| Water | 60 | 60 |
| Bruggolite FF6M | 2 | 2 |
| Chaser 2 | | |
| Water | 60 | 60 |
| t-Butyl Hydrogen Peroxide (70%) | 2 | 2 |
| Neutralizer | | |
| Ammonia solution (17%) | 20 | 20 |
| Biocide | | |
| Acticide MBS 2550 | 4 | 4 |

Based on Latex 1, Latex 2 was designed with only conventional surfactant. The reaction conditions are identical to that described for Example Latex 1.

Based on Latex 1, Latex 3 was designed with a single pre-emulsion feed. The pre-emulsion was fed over 4 hours. Past this, the reaction conditions were identical to that described for Example Latex 1.

Example Latexes 4, 5, and 6

Table 5 provides the compositions for latex formulas with various combinations of key specialty components.

TABLE 5

Chemical Compositions of Latexes 4, 5, and 6

| | Latex 4 Mass (g) | Latex 5 Mass (g) | Latex 6 Mass (g) |
|---|---|---|---|
| Reactor Charge | | | |
| Water | 550 | 550 | 550 |
| Sodium Carbonate | 2 | 2 | 2 |
| Rhodacal A246 (40% solids) | 38 | 38 | 38 |
| Stage 1 | | | |
| Water | 150 | 150 | 150 |
| Sodium Carbonate | 0.2 | 0.2 | 0.2 |
| Reactive Emulsifier (25% Solids) | 25 | 25 | 25 |
| BA | 43 | 43.2 | 42.6 |
| MMA | 243.4 | 246.6 | 242.2 |
| MAA | 12.2 | 12.2 | 12.2 |
| AAEM | 10 | 10 | 10 |
| Reactive Silane | | 3 | 3 |
| Epoxy Crosslinker | 5 | | 5 |
| Stage 2 | | | |
| Water | 350 | 350 | 350 |
| Sodium Carbonate | 0.6 | 0.6 | 0.6 |
| Rhodacal A246 (40% solids) | | | |
| Reactive Emulsifier (25% Solids) | 35 | 35 | 35 |
| BA | 393.2 | 381.9 | 390.9 |
| MMA | 229.2 | 229.2 | 228.7 |
| MAA | 25.2 | 25.2 | 25.2 |
| AAEM | 30 | 30 | 30 |
| Reactive Silane | | 10 | 10 |
| Phosphate Adhesion Promoter | 9 | 9 | |
| Chain Transfer Agent | 1 | 1 | 1 |
| Initiator | | | |
| Water | 60 | 60 | 60 |
| Ammonium Persulfate | 3 | 3 | 3 |
| Chaser 1 | | | |
| Water | 60 | 60 | 60 |
| Bruggolite FF6M | 2 | 2 | 2 |
| Chaser 2 | | | |
| Water | 60 | 60 | 60 |
| t-Butyl Hydrogen Peroxide (70%) | 2 | 2 | 2 |
| Neutralizer | | | |
| Ammonia solution (17%) | 20 | 20 | 20 |
| Biocide | | | |
| Acticide MBS 2550 | 4 | 4 | 4 |

Based on Latex 1, Latex 4 was designed with reactive emulsifier, epoxy crosslinker, and phosphate adhesion promoter. Past this, the reaction conditions were identical to that described for Example Latex 1.

Based on Latex 1, Latex 5 was designed with reactive emulsifier, reactive silane, and phosphate adhesion promoters. Past this, the reaction conditions were identical to that described for Example Latex 1.

Based on Latex 1, Latex 6 was designed with reactive emulsifier, reactive silane, and epoxy crosslinker. Past this, the reaction conditions were identical to that described for Example Latex 1.

Common quality control data for all example resins were measured. These show tight control of both the percentage weight solids and particle size.

TABLE 6

Resin QC Data

| Example | pH | % Wt. Solids | Particle Size (nm) |
|---|---|---|---|
| 1 | 8.7 | 40.6 | 96 |
| 2 | 8.8 | 40.7 | 100 |
| 3 | 8.6 | 40.2 | 105 |
| 4 | 8.7 | 40.3 | 97 |
| 5 | 8.9 | 40.7 | 117 |
| 6 | 8.7 | 40.1 | 102 |

Performance Results

The performances of the above latexes were evaluated in both clear and pigmented coatings.

Clear Coating Formula

Mix at a medium speed with blade capable of low shearing. Starting with the example emulsion, add each ingredient in the listed order, allowing 5 minutes to mix between ingredients, then 30 minutes at the end to fully mix. Let sit 30 minutes before testing.

To compare the performance of synthesized latex polymers, three commercial latex polymers designed with the same applications were also formulated and tested together. Formulations for these commercial polymers were individually optimized to the specific latex, containing different coalescents, thickeners, surfactants, defoamers etc., but were all formulated to the same total solids.

TABLE 7

Composition of Clear Coatings

| Component | Weight (g) |
|---|---|
| Example Emulsion | 645 |
| Silicon Defoamer | 3 |
| Ethylene Glycol (Solvent) | 10 |
| Texanol (coalescent) | 17 |
| HEUR Thickener | 6 |
| Surfactant | 12 |
| Ammonia (17%, pH Buffer) | 3 |
| Preservative | 4 |
| Water | 300 |
| Total | 1000 |

The clear coatings of the latex 1-6 and commercial latexes were evaluated in the following four areas:

1. Adhesion on Concrete

All coatings were applied onto either a 12"×12" concrete block using a foam brush and equal wet weights. Two coats were applied with a four-hour dry time in between to increase film build. The coatings were then dried for up to one week at ambient temperature. At 24 hours, 3 days, and 7 days of dry time, the dry and wet adhesion were checked through the following process. A razor blade and cross-hatch guide were used to scribe two sets of 1×1 mm squares. Elcometer 99 tape was applied to one set of squares, rubbed firmly to ensure full contact, and then pulled off to show dry adhesion. A wet paper towel was placed over the second set of squares for 10 minutes, then removed, blotted to remove excess water, and dried for 10 minutes. Then the Elcometer 99 tape was used in a similar manner to check this wet adhesion. These adhesion tests were scored using the ASTM D-3359 chart and combined into a single average rating from 1 B to 5 B for dry and wet adhesions.

2. Blushing Resistance

Clear coatings were cast on Leneta® Black Scrub Test Panel using a 6 mil latex film caster, then dried for 6 hours under ambient conditions. The sample panels were then submerged into water, and observed for the next 24 hours. The whiteness from film blushing was evaluated at 10 minutes, 1 hour, and 24 hour time points. These were combined into a single rating on a four-point word scale (poor, fair, good, excellent). A similar procedure was used for inorganic substrates such as tile, slate, and concrete. The application was performed using a foam brush and equal wet weights. A second coat could be applied four hours after the first to increase film build, and submerged after 4 hours of drying. Scoring was determined using the same scale.

3. Dirt Pick-Up Resistance (DPUR)

Clear coatings were cast on Leneta® White Scrub Test Panel using a 6 mil latex film caster, then dried for 24 hours under ambient conditions. Dry dirt was sifted onto the samples, then the substrate was put into a 120° F. oven for an hour, removed and tilted vertically to release the dirt. 15 light strokes of a paint brush were used to remove dirt, and then the persistent dirt was observed and rated on a four-point word scale (poor, fair, good, excellent). A similar procedure was used for inorganic substrates such as tile, slate, and concrete. The application was performed using a foam brush and equal wet weights. A second coat could be applied four hours after the first to increase film build. Coatings on inorganic substrates were dried for one week before testing with dirt. Scoring was determined using the same scale.

4. Hot Tire Pick-Up Resistance (HTPUR)

Clear coatings were applied onto a 4"×4" concrete tile using a foam brush and equal wet weights. Four coats were applied with two-hour dry times in between to increase film build. The coatings were then dried for one week at ambient temperature. Each tile was cut in half to fit into an Adjustable Tension Spring Block Tester. This apparatus and a tire tread were equilibrated inside an oven at 140° F. for 15 minutes. Then the cut tile was loaded into the block tester with the coating facing against the tire tread, and the tension spring was tightened to 100 lbs./in$^2$ pressure. This assembled apparatus was placed in the oven at 140° F. for one hour. Once removed, the tire tread was immediately removed from the tile. The coating surface was observed for delamination, imprints, marring or gloss differences, and discoloration. These were combined into a single rating on a four-point word scale (poor, fair, good, excellent).

The test results are summarized in Table 6. From this data the following conclusions can be drawn:

a. Example 2 shows that usage of a reactive surfactant improves blushing resistance and marginally improves adhesion on concrete;

Example 3 shows that a single stage polymer can achieve impressive properties, though a two stage polymer can further improve on DPUR and HTPUR properties.

Example 4 shows that inclusion of a reactive silane greatly improves the resistance to blushing and adhesion on concrete, while also marginally improving DPUR and HTPUR;

Example 5 shows that addition of an epoxy crosslinker is key for improving both DPUR and HTPUR properties;

Example 6 shows that utilization of a phosphate monomer improves blushing resistance and marginally improves adhesion on concrete;

Commercially available resins from three prominent resin manufacturers cannot match the exemplary performance achieved by these new polymers.

TABLE 8

Performance of Clear Coatings

| Property | Concrete Adhesion (Dry/Wet) | Blushing Resistance | DPUR | HTPUR |
| --- | --- | --- | --- | --- |
| Example 1 | 1B/1B | Poor | Fair | Poor |
| Example 2 | 5B/4B | Good | Good | Good |
| Example 3 | 5B/5B | Excellent | Good | Good |
| Example 4 | 3B/2B | Fair | Fair | Fair |
| Example 5 | 4B/4B | Excellent | Good | Good |
| Example 6 | 5B/4B | Good | Excellent | Excellent |
| Commercial Resin 1 | 4B/4B | Good | Excellent | Good |
| Commercial Resin 2 | 5B/1B | Excellent | Good | Fair |
| Commercial Resin 3 | 4B/1B | Poor | Fair | Good |

Pigmented Coating Formulation

The above resin performances were also tested and compared in a pigmented coating of which formulation is given in Table 9.

Mix mill container at high speed with pigment grinding blade capable of high shearing. Starting with water, add each ingredient in the listed order for the Mill table, allowing 5 minutes to mix between ingredients, then 30 minutes at the end to fully disperse pigments. Following this, transfer ingredients to letdown container, and continue to add the rest of the ingredients in order while stirring. Stir for 20 minutes before removing paint from the letdown. Their KU viscosity was adjusted from 95-105 KU by adding a nonionic Polyurethane Associative Thickener (HEUR). Let sit 30 minutes before testing.

To compare the performance of synthesized latex polymers, three commercial latex polymers designed with the same applications were also formulated and tested together. Formulations for these commercial polymers were individually optimized to the specific latex, containing different coalescents, thickeners, surfactants, defoamers etc., but were all formulated to the same total solids.

TABLE 9

Composition of Pigmented Coatings

| Mill | |
| --- | --- |
| Water | 180 |
| Ethylene Glycol (Solvent) | 5 |
| Dispersant | 10 |
| Wetting Agent | 5 |
| Defoamer | 3 |
| Dry TiO2 (Pigment) | 100 |
| Minex 4 (Filler) | 80 |
| Thixotropic Thickener | 2 |
| Letdown | |
| Example Resin | 510 |
| Defoamer | 2 |
| Water | 55 |
| Associative Thickener | 24 |
| Preservative | 3 |
| Texanol (Coalescent) | 13 |
| HEUR Thickener | 8 |

The pigmented coatings of the latex 1-6 and commercial latexes were evaluated in the following four areas:

1. Adhesion on Concrete

All formulations were applied onto either a 12"×12" concrete block using a foam brush and equal wet weights. One coat were applied and dried for up to one week at ambient temperature.

The coatings were then dried for up to one week at ambient temperature. At 24 hours, 3 days, and 7 days of dry time, the dry and wet adhesion were checked through the following process. A razor blade and cross-hatch guide were used to scribe two sets of 1×1 mm squares. Elcometer 99 tape was applied to one set of squares, rubbed firmly to ensure full contact, and then pulled off to show dry adhesion. A wet paper towel was placed over the second set of squares for 10 minutes, then removed, blotted to remove excess water, and dried for 10 minutes. Then the Elcometer 99 tape was used in a similar manner to check this wet adhesion. These adhesion tests were scored using the ASTM D-3359 chart, and combined into a single average rating from 1 B to 5 B for dry and wet adhesions.

2. Wet Durability

As a pigmented coating, formulations were applied to inorganic substrates such as concrete, tile, and slate using a paint brush and equal wet weights. The coatings were dried for 6 hours and then submerged into water, and observed for the next 24 hours. The substrates were removed from the water and immediately scratched with a hard tool such as a can opener. The softness and durability of the coating after water submersion were combined into a single rating on a four-point word scale (poor, fair, good, excellent).

3. Dirt Pick-Up Resistance (DPUR)

As a pigmented coating, formulations were applied to inorganic substrates such as concrete, tile, and slate using a paint brush and equal wet weights, and then dried for one week. Dry dirt was sifted onto the samples, then the substrate was put into a 120° F. oven for an hour, removed and tilted vertically to release the dirt. 15 light strokes of a paint brush were used to remove dirt, and then the persistent dirt was observed and rated on a four-point word scale (poor, fair, good, excellent).

4. Hot Tire Pick-Up Resistance (HTPUR)

As a pigmented coating, formulations were applied onto a 4"×4" concrete tile using a paint brush and equal wet weights. Two coats were applied with a four-hour dry time in between to increase film build. The coatings were then dried for one week at ambient temperature. Each tile was cut in half to fit into an Adjustable Tension Spring Block Tester. This apparatus and a tire tread were equilibrated inside an oven at 140° F. for 15 minutes. Then the cut tile was loaded into the block tester with the coating facing against the tire tread, and the tension spring was tightened to 100 lbs./in$^2$ pressure. This assembled apparatus was placed in the oven at 140° F. for one hour. Once removed, the tire tread was immediately removed from the tile. The coating surface was observed for delamination, imprints, marring or gloss differences, and discoloration. These were combined into a single rating on a four-point word scale (poor, fair, good, excellent).

The test results were summarized in Table 10. From this data the following conclusions can be drawn:

I. Example 2 shows that usage of a reactive surfactant improves wet durability and marginally improves adhesion on concrete;

II. Example 3 shows that a single stage polymer can achieve impressive performance across all four properties, though a two stage polymer can further improve on DPUR and HTPUR properties.

III. Example 4 shows that inclusion of a reactive silane greatly improves the wet durability and adhesion on concrete, while also marginally improving DPUR and HTPUR;

IV. Example 5 shows that addition of an epoxy crosslinker is key for improving both DPUR and HTPUR properties;

V. Example 6 shows that utilization of a phosphate monomer improves wet durability and marginally improves adhesion on concrete;

VI. Commercially available resins from three prominent resin manufacturers cannot match the exemplary performance achieved by these new polymers.

TABLE 10

Performance of Pigmented Coatings

| Property | Concrete Adhesion (Dry/Wet) | Wet Durability | DPUR | HTPUR |
|---|---|---|---|---|
| Example 1 | 2B/2B | Poor | Fair | Poor |
| Example 2 | 5B/4B | Good | Good | Good |
| Example 3 | 5B/5B | Excellent | Good | Good |
| Example 4 | 3B/3B | Fair | Fair | Good |
| Example 5 | 4B/4B | Excellent | Good | Good |
| Example 6 | 5B/5B | Good | Excellent | Excellent |
| Commercial Resin 1 | 5B/4B | Good | Excellent | Good |
| Commercial Resin 2 | 5B/3B | Excellent | Good | Good |
| Commercial Resin 3 | 4B/4B | Fair | Fair | Fair |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a durable latex polymer emulsion comprising:
   forming a pre-emulsion by combining a monomer composition with a reactive emulsifier, a reactive silane compound, an epoxy crosslinker, and a phosphate-containing monomer in water; and
   polymerizing the pre-emulsion by combining the pre-emulsion with a radical initiator to form a reaction mixture that polymerizes to form a hydride silicon-acrylic emulsion polymer.

2. The method of claim 1, wherein the epoxy crosslinker provides post and ambient crosslinking of the durable latex polymer emulsion.

3. The method of claim 1, wherein the reactive emulsifier includes a polymerizable surfactant.

4. The method of claim 3, wherein the polymerizable surfactant is an anionic ether sulfate surfactants.

5. The method of claim 1 wherein the monomer composition includes one or more monomers selected from the group consisting of (meth)acrylic acid monomers, (meth)acrylic monomers, vinyl acetate, aromatic monomers, vinyl neodecanoate, and combinations thereof.

6. The method of claim 1 wherein the monomer composition includes acetoacetoxyethyl methacrylate.

7. The method of claim 6 wherein the monomer composition includes one or more $C_{1-10}$ alkyl (meth)acrylates.

8. The method of claim 7 wherein the one or more $C_{1-10}$ alkyl (meth)acrylates include an acrylate selected from the group consisting of methyl acrylate, ethyl acrylate, propyl acrylate, butyl acrylate, hexyl acrylate, octyl acrylate, 2-ethylhexyl acrylate, and combinations thereof.

9. The method of claim 1 wherein the monomer composition includes a component selected from the group consisting of methyl acrylate, butyl acrylate and combinations thereof.

10. The method of claim 1, wherein the reactive silane compound have formula 1:

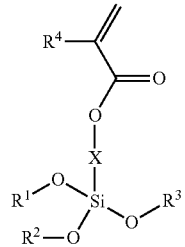

where:
X is a $C_{1-10}$ alkylenyl;
$R^1$, $R^2$, $R^3$ are each independently $C_{1-10}$ alkyl; and
$R^4$ is H or $C_{1-10}$ alkyl.

11. The method of claim 1 wherein the phosphate-containing monomer is a phosphate ester of a (meth)acrylate.

12. The method of claim 1 wherein the phosphate-containing monomer is a phosphate ester of polypropyelene glycol monomethacrylate.

* * * * *